United States Patent
Lai et al.

(10) Patent No.: US 9,923,991 B2
(45) Date of Patent: Mar. 20, 2018

(54) AUTOMATIC ONLINE REGISTRATION BASED ON DATA EXTRACTED FROM A DIGITAL IMAGE

(71) Applicant: Microsoft Technology Licensing, LLC, Redmond, WA (US)

(72) Inventors: Alex Lai, Menlo Park, CA (US); Songtao Guo, Cupertino, CA (US); Chris Degiere, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 249 days.

(21) Appl. No.: 14/841,527

(22) Filed: Aug. 31, 2015

(65) Prior Publication Data
US 2017/0064035 A1    Mar. 2, 2017

(51) Int. Cl.
*G06K 9/00* (2006.01)
*H04L 29/08* (2006.01)

(52) U.S. Cl.
CPC ........ *H04L 67/306* (2013.01); *G06K 9/00442* (2013.01); *G06K 9/00449* (2013.01); *G06K 9/00456* (2013.01); *G06K 9/00463* (2013.01); *G06K 9/00469* (2013.01); *H04L 67/141* (2013.01); *H04L 67/30* (2013.01)

(58) Field of Classification Search
CPC ...... G06Q 10/107; G06Q 10/10; G06Q 20/18; G06Q 20/32; G06Q 30/0241; G06Q 30/06; G06Q 30/0601; G06Q 50/26; G07B 15/063; H04L 51/16; H04L 67/30; H04L 67/306; H04L 67/141; G06K 9/00449; G06K 9/00442; G06K 9/00456; G06K 9/00463; G06K 9/00469
See application file for complete search history.

(56) References Cited

U.S. PATENT DOCUMENTS

| 5,818,442 A | 10/1998 | Adamson |
| 7,490,756 B1 | 2/2009 | Guggenheim |
| 2008/0298686 A1 | 12/2008 | Okochi |
| 2009/0248537 A1* | 10/2009 | Sarkeshik .......... G06Q 30/0601 705/26.1 |

(Continued)

OTHER PUBLICATIONS

Wallen, Jack, "Five Apps to Tame Your Business Card Chaos", Five Apps, dated Oct. 8, 2014, http://www.techrepublic.com/blog/five-apps/five-apps-to-tame-your-business-card-chaos/, 4 pages.

(Continued)

*Primary Examiner* — Le H Luu
(74) *Attorney, Agent, or Firm* — Hickman Palermo Becker Bingham LLP; Daniel D. Ledesma

(57) ABSTRACT

Techniques are provided for automatically creating online accounts based on digital images, such as digital images of business cards. In one technique, multiple data items that have been extracted from a digital image of a business card are identified. A particular data item is contact information of a user associated with (or identified by) the business card. A verification code is sent, based on the particular data item, to a computing device of the user. The verification code is received from the computing device of the user. In response to receiving the verification code an account is created for the user and the account is modified to include a least some of the multiple data items.

15 Claims, 9 Drawing Sheets

(56) References Cited

U.S. PATENT DOCUMENTS

| | | | | |
|---|---|---|---|---|
| 2009/0248577 | A1* | 10/2009 | Hoj | G07B 15/063 |
| | | | | 705/40 |
| 2010/0042523 | A1* | 2/2010 | Henry | G06Q 10/10 |
| | | | | 705/34 |
| 2012/0205453 | A1* | 8/2012 | Rampersad | G06Q 50/26 |
| | | | | 235/494 |
| 2012/0271692 | A1* | 10/2012 | Huang | G06Q 30/06 |
| | | | | 705/14.23 |
| 2014/0047505 | A1* | 2/2014 | Stibel | G06Q 10/107 |
| | | | | 726/2 |
| 2014/0249898 | A1* | 9/2014 | Ostoich | G06Q 30/0241 |
| | | | | 705/14.4 |
| 2015/0019305 | A1* | 1/2015 | Gorawala | G06Q 30/0241 |
| | | | | 705/14.4 |
| 2015/0134323 | A1 | 5/2015 | Cuthbert | |
| 2015/0227761 | A1* | 8/2015 | Cohen | H04L 51/16 |
| | | | | 726/30 |
| 2016/0012445 | A1* | 1/2016 | Villa-Real | G06Q 20/32 |
| | | | | 705/44 |
| 2016/0012465 | A1* | 1/2016 | Sharp | G06Q 20/18 |
| | | | | 705/14.17 |

OTHER PUBLICATIONS

Lai, U.S. Appl. No. 14/841,538, filed Aug. 31, 2015, Office Action, dated Jul. 7, 2017.

* cited by examiner

250

260

AUTOMATIC ONLINE REGISTRATION BASED ON DATA EXTRACTED FROM A DIGITAL IMAGE

CROSS REFERENCE TO RELATED APPLICATION

This application is related to application Ser. No. 14/841,538 filed Aug. 31, 2015, entitled "LEVERAGING DIGITAL IMAGES OF USER INFORMATION IN A SOCIAL NETWORK"; the entire content of which is incorporated by this reference for all purposes as if fully disclosed herein.

TECHNICAL FIELD

The present disclosure relates to data processing and, more particularly, to leveraging data extracted from a digital image to register a user with a product or service.

BACKGROUND

Online registration for a product or service is a common task for modern users. People provide personal information to register with social networks, with trade show, and with other content or service providers. Many users rely on smartphone and other mobile devices to not only register with a product or service, but to consume content, utilize services, and participate in online communities. One of the main drawbacks of registering a product or service is the cumbersome nature of manually entering data. To compound the problem, many mobile devices have relatively small touchscreens or physical keyboards.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A method and system are provided for automatically creating an account for a user (or registering the user) based on a scan of a business card of the user. In one technique, user takes a photo the user's business card. The photo is analyzed to identify characters and words and the characters and words are associated with certain attributes, such as person's name, company name, company address, and mobile phone number. Before creating an account for the user, a verification code is sent to the user, for example, through text message or through email. If the user responds with the proper verification code, then an account is created for the user. Additionally, some of the identified attribute values of at least some of the attributes are stored in the account. In this way, registering a user is relatively quick and involves minimal input from the user.

In a related technique, a user's existing account or online profile is updated automatically based on a scan of a business card of the user. The online server identifies an existing account of the user and compares any data items that are recognized with data items already stored in the existing account. If, for example, a photo-recognized company name does not match a company name indicated in the account, then the photo-recognized company name replaces that company name.

Although the following description provides examples involving business cards, embodiments may include other types of cards that include non-business-related information, either additionally or exclusively. An example of another type of card may include only personal information, such as a personal address (of a person named on the card) as opposed to a business address. An example of another type of card is a school or academic card that a full-time or part-time student might have, where the card identifies an academic institution at which the student is currently enrolled. Another example is a resume that includes personal information about a person and information about the person's work and/or academic history.

System Overview

Figure 1:
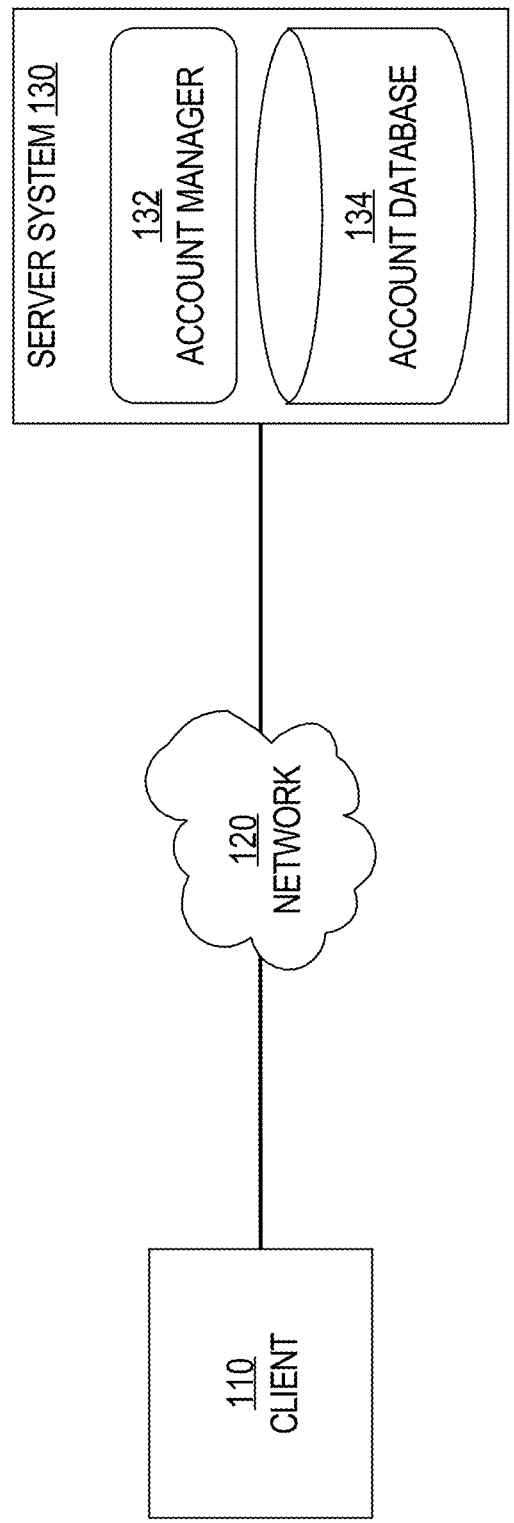
FIG. 1 is a block diagram that depicts a system for creating an account for a user, in an embodiment.

FIG. 1 is a block diagram that depicts a system 100 for creating an account for a user, in an embodiment. System 100 may also be used to implement other techniques described herein. System 100 includes client 110, network 120, server system 130, and storage 140.

Client 110 is an application or computing device that is configured to communicate with server system 130 over network 120. Examples of computing devices include a laptop computer, a tablet computer, a smartphone, a desktop computer, a personal digital assistant (PDA), and a scanning device that is configured to generate electronic scan data based on information reflected on a physical medium, such as paper, a printed photo, or a business card. Thus, a computing device may include camera components that are capable of taking a picture (i.e., creating a digital image of a camera view). An example of an application includes a dedicated application that is installed and executed on a local computing device and that is configured to communicate with server 130 over network 120. Another example of an application is a web application that is downloaded from server system 130 and that executes within a web browser running on a computing device. Client 110 may be implemented in hardware, software, or a combination of hardware and software. Although only a single client 110 is depicted, system 100 may include multiple clients that interact with server system 130 over network 120.

Through client 110, a user is able to upload digital images and/or other digital information to server system 130. Later, the user may employ client 110 to interact with server 130 to retrieve, supplement, and/or update digital information (or simply "data").

Network 120 may be implemented on any medium or mechanism that provides for the exchange of data between client 110 and server system 130. Examples of network 120 include, without limitation, a network such as a Local Area Network (LAN), Wide Area Network (WAN), Ethernet or the Internet, or one or more terrestrial, satellite or wireless links.

Server System

Although depicted as a single element, server system 130 may comprise multiple computing elements and devices, connected in a local network or distributed regionally or globally across many networks, such as the Internet. Thus, server system 130 may comprise multiple computing elements other than account manager 132 and account database 134. Account manager 132 creates or updates accounts based on data extracted from a digital image. Additionally, account manager 132 receives account data from computing devices (e.g., client 110) over network 120, where the account data is input by users (e.g., selecting characters on a physical or graphical keyboard) operating the computing devices.

Account database 134 comprises information about multiples accounts. Account database 134 may be stored on one or more storage devices (persistent and/or volatile) that may reside within the same local network as server system 130 and/or in a network that is remote relative to server system. Thus, although depicted as being included in server system 130, each storage device may be either (a) part of server system 130 or (b) accessed by server system 130 over a local network, a wide area network, or the Internet.

In a social networking context, server system 130 is provided by a social network provider, such as LinkedIn, Facebook, or Google+. In this context, each account in account database 134 includes a user profile, each provided by a different user. A user's profile may include a first name, last name, an email address, residence information, a mailing address, a phone number, one or more educational institutions attended, one or more current and/or previous employers, one or more current and/or previous job titles, a list of skills, a list of endorsements, and/or names or identities of friends, contacts, connections of the user, and derived data that is based on actions that the candidate has taken. Examples of such actions include jobs to which the user has applied, views of job postings, views of company pages, private messages between the user and other users in the user's social network, and public messages that the user posted and that are visible to users outside of the user's social network (but that are registered users/members of the social network provider).

Some data within a user's profile (e.g., work history) may be provided by the user while other data within the user's profile (e.g., skills and endorsement) may be provided by a third party, such as a "friend," connection, colleague of the user.

Server system 130 may prompt users to provide profile information in one of a number of ways. For example, server system 130 may have provided a web page with a text field for one or more of the above-referenced types of information. In response to receiving profile information from a user's device, server system 130 stores the information in an account that is associated with the user and that is associated with credential data that is used to authenticate the user to server system 130 when the user attempts to log into server system 130 at a later time. Each text string provided by a user may be stored in association with the field into which the text string was entered. For example, if a user enters "Sales Manager" in a job title field, then "Sales Manager" is stored in association with type data that indicates that "Sales Manager" is a job title. As another example, if a user enters "Java programming" in a skills field, then "Java programming" is stored in association with type data that indicates that "Java programming" is a skill.

In an embodiment, server system 130 stores access data in association with a user's account. Access data indicates which users, groups, or devices can access or view the user's profile or portions thereof. For example, first access data for a user's profile indicates that only the user's connections can view the user's personal interests, second access data indicates that confirmed recruiters can view the user's work history, and third access data indicates that anyone can view the user's endorsements and skills.

In an embodiment, some information in a user profile is determined automatically by server system 130 (or another automatic process). For example, a user specifies, in his/her profile, a name of the user's employer. Server system 130 determines, based on the name, where the employer and/or user is located. If the employer has multiple offices, then a location of the user may be inferred based on an IP address associated with the user when the user registered with a social network service (e.g., provided by server system 130) and/or when the user last logged onto the social network service.

While many examples herein are in the context of social networking, embodiments are not so limited. For example, instead of registering with a social network provider, a user may register with a trade show, a grocery store chain (e.g., in order to obtain discounts on future purchases), an online contest, or a financial institution, such as a bank. As another example, a user may register with any online service to be eligible for a free product, service, or prize.

Process Overview

Figure 2A:
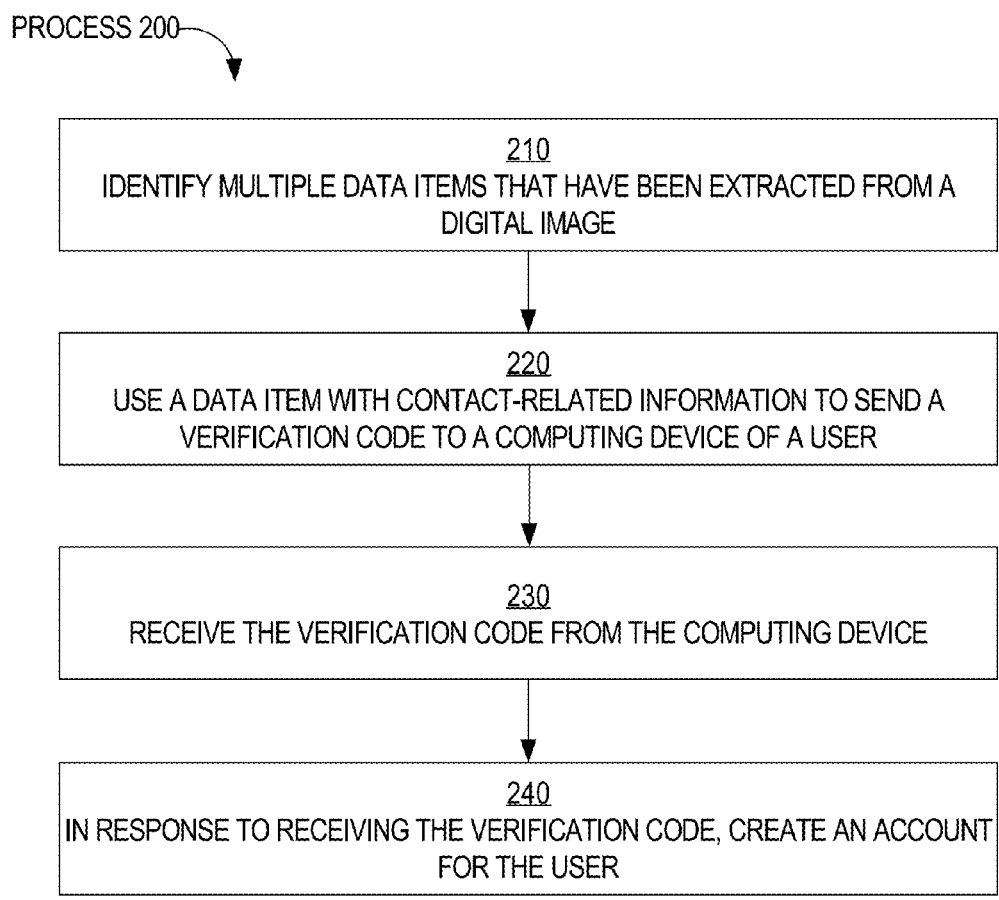
FIG. 2A is a flow diagram that depicts a process for automatically registering a user, in an embodiment.

FIG. 2A is a flow diagram that depicts a process 200 for automatically registering a user, in an embodiment. Process 200 may be implemented by client 110, server system 130 or a combination of client 110 and server system 130.

At block 210, multiple data items that have been extracted from a digital image are identified. The digital image may be of a business card that is associated with a particular user. The digital image may be in one of many different formats, such as a .jpg file, a .png file, a .tif file, or a .gif file.

Figure 2B:
FIG. 2B is a block diagram that depicts an example business card and a mobile device that displays a digital image of the business card, in an embodiment.
Figure 2B:

FIG. 2B is a block diagram that depicts an example business card 250 and a mobile device 260 that displays a digital image of the business card, in an embodiment.

Block 210 may be preceded by server system 130, client 110, or a third party service employing a camera or scanning device to generate the digital image. Then, one or more optical character recognition (OCR) techniques may be used to recognized and extract characters and words from the digital image. One or more pre-processing techniques may be used to convert the digital image into a different format, such as from a .png file to a .jpg file, before an OCR technique is applied.

An OCR technique may be implemented by the same or different (e.g., remote) device as the device that generates the digital image. For example, a user operating client 110 (e.g., a mobile device that includes a camera) takes a picture of a business card of the user (or another user). The picture (or digital image) is then transmitted over network 120 to server system 130, which implements an OCR technique relative to the digital image.

The data items that are identified in block 210 include information about a user, such as the user's first name, last name, employer name, employer address, job title, and contact information (e.g., email address and/or phone number).

A business card may label at least some of the data items. For example, the business card may have the phrase "First Name:" that precedes a string of consecutive characters. As another example, the business card may have the word "Address:" that precedes a string of characters that is typical of an address. As another example, the business card may have the word "Phone Number:" that precedes a string comprising 10 numeric characters and two or more periods ("."), dashes ("-"), or spaces (" ") among the numeric characters. In this way, an OCR technique may rely on the labels in order to automatically associate the appropriate label with the individual data items (or associate each data item with the appropriate attribute) with a high degree of confidence. A label indicates an information type, such as first name, company name, phone number, and email address. Alternatively, a business card may not have any labels. Thus, an OCR technique analyzes patterns in the text that is extracted from a digital image.

In a related embodiment, an OCR technique merely recognizes characters in a digital image and an order among of the characters and it is the responsibility of another software process and/or hardware component to determine how to delineate among the data items and label them appropriately. For example, since many phone numbers, email addresses, web domain names, and addresses follow certain patterns, such data items may be easier to identify. Identifying and labeling the remaining data items (such as person name and company name) may be easier once the other data items are already identified and labeled.

Figure 2C:
FIG. 2C is a block diagram that depicts screenshots generated during a registration process, in an embodiment.

Block 210 may also involve displaying an option on a computing device of the user to create an account. FIG. 2C is a block diagram that depicts example screenshots generated during a registration process, in an embodiment. Screenshot 270 depicts information that was extracted from the digital image, such as the user's name, an organization name ("LinkedIn" in the depicted example), job title, and a time period at the identified organization. Screenshot 270 also includes a "Create Account" button that invites the user to create an account, which is accomplished at least partially by selecting the button.

At block 220, the contact information is used to send a verification code to the computing device of the user. The verification code may be any string of values, such as alphanumeric characters.

In an embodiment, as depicted in FIG. 2C, the verification code is displayed on the computing device of the user. Screenshot 280 includes a prompt to accept or reject receiving the verification code. Alternatively, instead of including the prompt, screenshot 280 includes an option to receive the verification code by text message or by email. This option may be displayed if both a phone number and an email address of the user is identified from the digital image. The option may also indicate the extracted phone number and the extracted email address in case one or both are incorrect.

The verification code may have been generated as part of 210 or after the digital image was generated. For example, in response to detecting contact information in the digital image, server system 130 generates the verification code. Alternatively, the verification code may have been generated prior to the digital image being created. For example, server system 130 generates a set of verification codes and selects one of the verification codes (e.g., randomly or in a serial fashion) when a digital image is received. Thus, a verification code may be used twice (i.e., for different users). Regardless of when a verification code is generated, the verification code is associated with the contact information or the user identified in the digital image.

If the contact information is a phone number, then the verification code is sent via a text message, such as a SMS or MMS message, over a cellular network. In this scenario, the computing device is a mobile phone and the phone number is of the mobile phone. If the contact information is an email address, then the verification code is sent over a data network (e.g., network 120) in an email message to an email account identified by the email address. The user accesses the email account using a computing device and views the email message.

In either scenario, the user is presented with a user interface that is presented through the computing device and that includes the verification code. For example, the user interface is provided by server system 130 through a web browser executing on the computing device. As another example, the user interface is generated by a mobile application executing on the computing device.

In both scenarios, the user views the verification code (whether through text message or email) and provides input through a user interface. The input may be text input (where the user manually enters the verification code through, for example, a graphical keyboard displayed on a smartphone) or voice input (where the user speaks the verification code and the verification code is automatically translated into text, whether at the computing device or remotely, such as at server system 130).

Screenshot 280 of FIG. 2C depicts a user interface that includes (1) a text field into which the user enters the verification code and (2) a button that, when selected, causes the verification code to be sent to server system 130.

At block 230, the verification code is received from the computing device of the user. For example, the application or web application executing on the computing device sends the verification code over network 120 to server system 130.

At block 240, in response to receiving the verification code, an account is created for the user. For example, account manager 132 creates an account and stores the account (with its corresponding details) in account database 134. A new account may have multiple default attributes, such as first name, last name, employer name, employer address, employer web domain name, phone number, email address, and job title. The new account is modified to include some (or all) of the data items (or attribute values that correspond to the attributes) identified in block 210, such as the user's name, job title, employer name, and employer address.

In some cases, a new user may be self-employed. For example, server system 130 determines that no employer name was identified among the information extracted from a digital image. Server system 130 may send, to client 110, a prompt that verifies whether the new user is self-employed. If the new user provides the appropriate input (e.g., via manual selection of a graphical button), then account manager 132 stores, in association with the new account, employment data that indicates whether the new user is self-employed.

If the user initiated process 200, then block 240 may involve prompting the user to verify the accuracy of one or more extracted data items before the extracted data items are stored persistently in association with the new account or before the user and/or other users access the new account. A prompt may be provided only for data items that server system 130 (or an OCR process) is not confident about. Confidence may be measured in one of multiple ways and a confidence score may be based on any scale, such as between 0 and 1, where any confidence score above, for example, 0.7 is considered highly confident.

For example, server system 130 may be highly confident that a data item is the user's name and that the user's name was extracted accurately. In that case, no prompt would be displayed. However, server system 130 may not be highly confident that a data item is an employer name or that the employer name was extracted accurately. In that case, a prompt is displayed. A prompt may involve a user interface that presents the user with two options: "Yes" and "No." If "No" (or not accurate), then the user is allowed to correct a spelling of the employer name or to relabel the data item as an employer name.

After the account is created, the user may be prompted, through the computing device, to create at least a password for the account and, optionally, a username. Initially, the username may be set to a portion of the contact information extracted from the digital image, such as email address or mobile phone number. Thus, thereafter, the user may securely access the newly created account with the username and password.

In an embodiment, client 110 includes a mobile application that is configured to have two modes: a pre-registration mode and a post-registration mode. Based on the mode, the mobile application allows a user to perform different functions. For example, in pre-registration mode, the mobile application allows a user to take a picture of a business card and upload the business card over network 120 to server system 130 so that server system 130 may analyze the picture and recognize data items reflected in the picture. In post-registration mode, the mobile application allows the user to access his/her account and initiate one or more operations that the user was not allowed to initiate in pre-registration mode.

A Specific Example

As a specific example, a user takes a photo of the user's business card with a camera, smartphone, or other mobile device that includes a camera. The photo is sent to an online service that implements an optical character recognition technique. The online service tokenizes character elements detected in the photo. The online service (or another component) labels or associates the tokenized elements with specific profile attributes, such as name, business address, company name, and phone number. The tokenized elements may be displayed to the user to allow the user to confirm the accuracy of the tokenized elements. A verification code is sent to a computing device of a user (same or different as the original user) or to an online account (e.g., email account) of the user. The identity of the computing device (e.g., mobile phone number) or online account may have been extracted from the photo. The (notified) user receives the verification code and then submits the verification code to the online service (or another component). If the verification code is legitimate, then the online service creates an account for the notified user. The account is automatically populated with at least some of the tokenized elements. For example, a name is recognized in the photo and stored as (or labeled as) a name. Similarly, a business address is recognized in the photo and stored as (or labeled as) a business address.

In a related embodiment, a verification code is not employed in process 200. Instead, a user is automatically registered based on data items that are extracted from a digital image. For example, a user downloads, to her mobile device, an application from an "application store." The application allows the user to take a picture of a business card and sends the picture (or digital image) over network 120 to server system 130. Account manager 132 creates an account based on data items extracted from the digital image. Server system 130 sends, over network 120 to the application, a notification that notifies the user that the user successful registered. The notification may include the data items that were extracted and may prompt the user to make any corrections to the data items using the application.

In either embodiment, a check may be performed to determine whether the user is already a registered user with server system 130. For example, a name that is extracted from the digital image is compared to names of one or more registered users to determine if there is a match. If there is a match (and, optionally, one or more other data items extracted from the digital image match data items of the same existing account), then a new account may not be automatically created and/or further input from the user is required in order for a new account to be created.

Taking a Picture of Another's Business Card

The following example is similar to the example above except that a first user takes a photo of a second user's business card. The second user may have given the business card to the first user at a trade show or client meeting. As part of the process, an invitation is sent to a computing device of the second user or to an online account (e.g., email account) of the second user. Again, the identity of the computing device (e.g., mobile phone number) or online account may have been extracted from the photo of the business card. The second user receives the notification and then provides input that indicates that the second user would like an online account to be created for the second user, such as an account maintained by a social network provider. The notification may be text message or an email that includes a link that the second user selects. The notification may include tokenized elements (or data items) that were extracted from the photo and that are labeled as, for example, first name, last name, company name, business address, phone number, etc. The link may be a unique link that was generated for the second user. For example, the link may include a unique code that is associated with the second user and the extracted profile information. The link, when selected by the second user, causes a web page to be displayed that indicates that an online account is automatically created for the second user or that such an account may be created based on further input from the second user, such as confirmation that the extracted information is accurate and/or labeled properly.

In an embodiment where server system 130 hosts a social networking service and the first user (i.e., who is taking a picture of a business card of the second user) is a registered member of the service, a connection (or friend) request is automatically generated (e.g., by server system 130) for the second user. The second user may view the connection request when, for example, the second user logs into his/her account or when the second user receives a notification via a mobile application executing on the second user's device. When displayed to the second user, the connection request indicates that the first user (i.e., the user that initiated creation of one or more digital images of the second user's business card) would like to connect to (or be "friends" with) the second user. The connection request may identify the first user as the person who took a picture of the second user's business card. In this way, the first user is not required to provide explicit input (other than taking a picture of the second user's business card) to send the second user a connection request. If the second user provides certain input (such as selecting an "Accept" button that is displayed as part of the connection request), then an connection or association between the second user and the first user is created in server system 130. Thereafter, the second user and the first user are considered friends or connections of each other in a social network.

In a related embodiment, a connection request is automatically generated for the first user. This connection request may be created in response to determining that an account is automatically created for the second user and/or determining that the second user provides input that indicates a desire to connect with the first user.

In a related embodiment, instead of automatically generating a connection request for the second user or the first user, a connection recommendation is automatically generated. When selected by, for example, the second user, a connection request is generated and delivered to the first user.

In an embodiment, a connection request is automatically generated only when the second user is a member of the social networking service.

Determining How a Verification Code is Delivered

In an embodiment, a determination is made regarding whether to send a verification code over a cellular network to the second user's computing device or over a data network to an online account associated with the second user, such as in an email addressed to an email account of the second user. The email may be identified automatically based on recognizing the email in a digital image of the second user's business card. The determination may be based on the current time of day or based on a mode in which an application (of client 110) is currently executing. For example, if the current time of day is between 9 AM and 6 PM, then a text message is sent (over a cellular network) to a computing device of the second user. Receiving a text message during night hours may be considered bad etiquette. Thus, during evening and night hours (e.g., between 6 PM of one day and 9 AM of the next day), a verification code is sent over a data network instead (such as in the form of an email).

As another example, an application with which the first user interacts on client 110 may be in one of multiple modes, including a current scan mode and a later scan mode. In the current scan mode, a verification code is sent over a cellular network to a computing device of the second user. In later scan mode, a verification code is sent over a data network to an online account associated with the second user. The first user provides input that indicates in which mode the application should operate or function. The current scan mode presumes that the user recently (e.g., within the last few minutes) received a business card that is about to have its picture taken. The later scan mode presumes that a significant amount of time has passed since the user received such a business card. For example, a user may collect multiple business cards at a trade show during the day and, at the end of the day, take a picture of all the business cards in relatively quick succession.

In a related example, instead of modes, a user provides, through client 110, input that indicates whether a verification code is to be sent over a cellular network or a data network (or using a text message v. an email message). The input may be prior to taking a picture of a business card or after taking the picture. For example, an application executing on client 110 may prompt the first user (of client 110) to indicate how the verification code should be sent to a second user. The prompt may include multiple options, such as text message, email message, or other message, such as a notification that is sent to an online account associated with the second user and which will be automatically forwarded over a data network to a computing device of the second user. The first user selects one of the multiple options, which causes the message to be sent.

Date Item-Specific Processing

In an embodiment, different data items that are extracted from a digital image are treated differently. For example, it is determined which extracted data items to include in a new account or what access privileges are applied to individual data items. As a specific example, a company name is treated differently than a phone number. A company name may be automatically included in a new account while a phone number is not. Alternatively, both data items are included in a new account, but the company name is considered public information that other users or members of server system 130 can view while the phone number is considered private information that only certain users can view, such as users that are "friends" or connections of the new user (i.e., corresponding to the new account).

Access privileges may include public, private, and semi-private privileges. A public privilege may indicate that any user that accesses server system 130 (whether or not the user is a registered member) is allowed to view a "public" data item (e.g., a business phone number). A private privilege may indicate that only confirmed connections or "friends" of a user are allowed to view a "private" data item (e.g., an email address). A semi-private privilege may indicate that only registered members of server system 130 (or a social network provider) are allowed to view a "semi-private" data item (e.g., a Twitter ID). More or less access privileges may be defined. For example, a "super private" privilege may be that only certain connections of a user are allowed to view a "super private" data item (e.g., a home phone number).

In an embodiment, each account attribute (e.g., name, address, employer name, web domain address, phone number, email address) is associated with default access privileges, some of which may be different than others for the same account. Thus, when a new account is created, the new account includes these default access privileges. Therefore, if a first data item is associated with a first attribute that has a first access privilege, then the first data item is stored in the new account in association with the first access privilege. If a second data item is associated with a second attribute that has a second access privilege, then the second data item is stored in the new account in association with the second access privilege.

In an embodiment, a user associated with a new account is prompted to confirm or verify a type of access privilege for one or more date items. For example, the user is prompted (e.g., through a mobile application that was used to initiate creation of the digital image) to confirm that a company name is to be associated with a public privilege. This prompt may be provided for each extracted data item or only for extracted data items that are deemed private, semi-private or super private. Thus, a user may not be prompted to verify an access privilege for extracted data items that are by default considered "public." A prompt may be provided before the new account is officially created or available for subsequent access by the new user or other users. Alternatively, the prompt may be provided when the new user accesses the new account for the first time. Alternatively, the prompt may be provided when the new account becomes available to one or more other users or when one or more connections of other users with the new account are created.

Updating an Existing Account

In an embodiment, one or more data items that are extracted from a digital image (e.g., of a business card) are used to automatically update an existing account of a user. In this way, a user may update, for example, the user's job title, employer name, and work address simply by scanning a new business card of the user.

Figure 3:
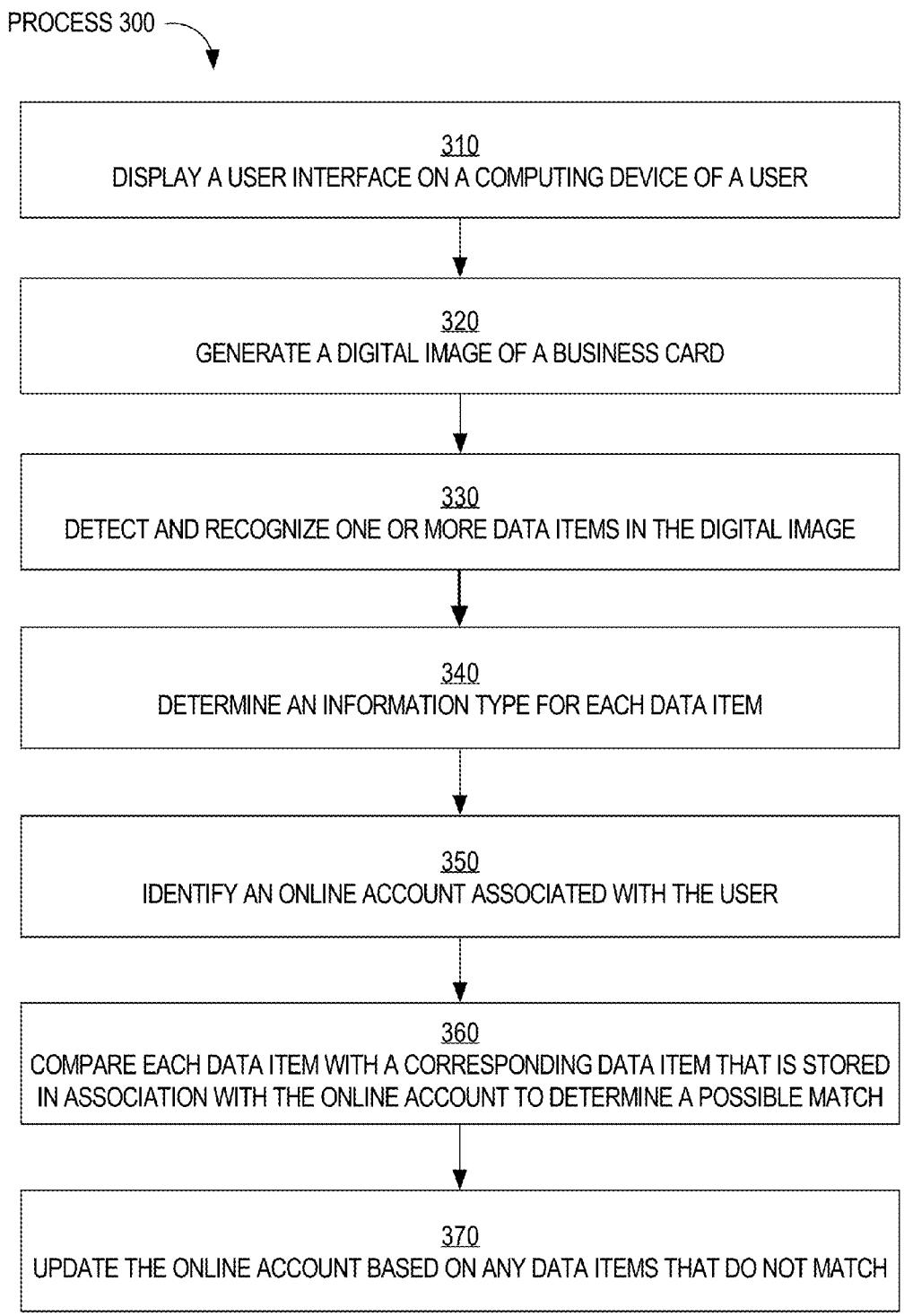
FIG. 3 is a flow diagram that depicts a process for updating an account of a user, in an embodiment.

FIG. 3 is a flow diagram that depicts a process 300 for updating an account of a user. Process 300 may be performed by account manager 132 or another component of server system 130.

At block 310, a user interface generated by an application is displayed by a computing device (e.g., client 110). At block 310, the user operating the computing device may be logged into server system 130 already. The application may be a mobile application that is configured to communicate with server system 130 over network 120. Alternatively, the application may be a web application that is executing within a web browser.

At block 320, a digital image is generated. For example, a user points a camera at a business card or other medium (printable or otherwise) that includes user information and causes the camera to take a picture, resulting in a digital image that is stored in client 110. Subsequently, the user, using an application, selects a name assigned to the digital image and causes the digital image to be uploaded to server system 130 or another (e.g., affiliated) online service that performs OCR. As a related example, a mobile application executing on client 110 communicates with a camera that is integrated with client 110 and receives input from a user (e.g., selection of a graphical button on a touch screen display) that causes the camera to take a picture.

Taking of the picture may automatically initiate a process in which the digital image is sent to an OCR process, which may execute on client 110 (e.g., as part of the mobile application) or may execute on a device that is remote to client 110.

At block 330, as part of an OCR process, one or more data items are detected and recognized in the digital image. Block 330 may be performed by server system 130 or another computing component, such as a third-party service that is communicatively coupled to server system 130. If the latter, then the other computing component sends the one or more data items to server system 130.

At block 340, an information type is determined for each data item of the one or more data items. For example, one data item may be determined to be an employer name while another data item may be determined to be a phone number. Block 340 may be performed by server system 130 or by another computing component, such as one that also performed OCR on the digital image.

At block 350, an online account is identified. The online account may be identified based on an identity of a user who is logged into server system 130 and who initiated the generation of the digital image. Alternatively, the online account may be identified based on an identity of the computing device from which the digital image was received. Alternatively, the online account may be identified based on information extracted from the digital image, such as a phone number or an email address.

At block 360, each data item is compared to a corresponding data item that is stored in association with the online account to determine whether there is a match. Thus, if an extracted data item is a particular company name, then the particular company name is compared to an existing value for company name in the online account. A match may involve an exact match (e.g., where each character from one data item must match a corresponding character in the other data item). Alternatively, a match may be a "fuzzy" match where the data items do not exactly match. For example, an extracted data item may be "XYZ, Inc." and a corresponding data item in an online account is "XYZ Incorporated."

If only a single data item was extracted from the digital image at block 330, then block 360 may involve a single comparison. If multiple data items were extracted at block 330, then block 360 may involve multiple comparisons, one for each extracted data item.

In one scenario, an extracted data item may not have a counterpart in the online account. For example, a phone number was extracted from the digital image but the online account does not include a phone number for the user. In an embodiment, this is considered to not be a match, in which case the online account is automatically updated to include the phone number. In a related embodiment, the user is prompted to first confirm that s/he desires to have the phone number included in the online account.

If block 360 is negative (i.e., there is no match), then process 300 proceeds to block 370.

At block 370, the online account is updated based on the one or more data items that do not match. For example, if the company name extracted from the digital image is different than the company name that is currently stored in the online account, then the current company name is replaced, in the online account, with the extracted company name.

"Noisy" OCR

The prior description assumes that OCR provides a high quality extraction of data items from a digital image. However, there may be many "noisy" results where the information is not accurate. For example, an extracted company name may be "Linkedn" where the actual company name on the business card is "LinkedIn." As another example, an extracted URL may be "(ompauywctisile.com" where the actual URL on the business card is "companywebsite.com." Not only can an incorrect OCR extraction be a nuisance, it may trigger an undesired profile update, such as changing the user's current employer's name.

In an embodiment, a social graph is used to improve OCR extraction. In other words, known entities (e.g., person name and company name) and their respective relationships reflected in a social graph are used to correct recognition errors present in an OCR extraction. For example, if a person's name and email address are accurate, then such information is used to identify the person from the social graph. One or more members who are connected to the person in the person's social graph are identified and one or more profile data items in their respective profiles are compared to the extracted data items. If the edit distance between an extracted data item and a profile data item of another member (especially a profile data item that was manually entered by the other member) is zero (indicating an exact match), then it is determined that the extracted data item was correctly recognized. Alternatively, multiple profile data items (e.g., four), each from a different profile, that have an edit distance of zero relative to the extracted data item may need to be identified before determining that the extracted data item was correctly recognized since one or two matches may not be significant.

If the edit distance between an extracted data item and a profile data item of another member is greater than zero but less than a particular threshold (e.g., less than three), then it may be determined that the extracted data item was incorrectly recognized. Alternatively, multiple comparisons that result in non-zero edit distances are performed for a single extracted data item before it is determined that the extracted data item was incorrectly recognized. In this case, the profile data item that is associated with the smallest edit distance relative to the extracted data item is selected as a candidate data item. An online account/profile (whether old or new) may be modified to include the candidate data item. Alternatively, user input is prompted to confirm that the candidate data item is indeed correct (e.g., among multiple candidate data items) before updating the online account/profile.

In a related embodiment, server system 130 maintains a list of known entities, such as person names, organization names, organization phone numbers, and organization URLs. There may be a separate list for each type of information. A list of known entities may come from existing members of a social network hosted by server system 130. The list of known entities may be limited to entities that are found in at least a certain number of member profiles (e.g., sixty). An extracted data item from a digital image is then used to traverse a list of known entities. For example, if an extracted data item is determined to be either a person name or an organization name (or definitely not a phone number, email address, or URL), then the extracted data item is compared to entities in a list of person names and a list of organization names. If the extracted data item matches a name in one of the lists, then it is presumed that the extracted data item was recognized correctly. Even if the extracted data item does not match any name in any of the lists, the extracted data item may still be recognized correctly because, for example, a new company name might not match any previous company name. However, it is determined that a non-matching extracted data item was incorrectly recognized if the extracted data item has a non-zero edit distance (with respect to one or more profile data items) that is less than a particular threshold (e.g., four).

In an embodiment, data items related to a matching data item (i.e., that matches an extracted data item) are used to spell check and/or correct data items that were extracted from the same digital image or business card as the extracted data item. In this embodiment, multiple data items pertaining to each of multiple organizations are stored (e.g., by server system 130). For example, a record for a particular company includes a name of the company, a phone number of the company, a URL of the company, and an address of the company. Later, when an extracted data item from a digital image is identified, it is determined whether the extracted data item matches a data item in a record of multiple records. If the extracted data item matches a data item in a particular record, then the other data items included in the particular record are used to spell check or correct other data items extracted from the digital image. For example, if the edit distance between a second extracted data item and a data item from the particular record is greater than zero and less than four, then it may be presumed that the second extracted data item is incorrectly spelled and the second extracted data item may be replaced with the data item from the particular record.

Two-Sided Business Card

Some business cards may include information about a company and/or person on both sides. In an embodiment, a user is allowed to scan both sides of a card, resulting in two digital images. Information extracted from both sides are used to populate a new account or update an existing account.

In an embodiment, a user is prompted to indicate whether a business card has two sides. Such a prompt may be provided (a) prior to the first digital image is created, (b) after the first digital image is created but before the second digital image is created, or (c) after two digital images are created.

In an alternative embodiment, server system 130 (or client 110) automatically determines whether two digital images are based on of the same business card. Example criteria for determining that two digital images are of the same business card include a timestamp associated with each digital image, similarity in artifacts detected in the digital images, an extracted data item that is identified in each digital image, and/or complementary information in both digital images.

For example, if two digital images are created within two minutes of each other, then it may be more likely that the two digital images are of different sides of the same business card. As another example, if two digital images have the same or similar formatting (e.g., same text font and border color) and/or if the same organization name is extracted from two digital images, then it may be more likely that the two digital images are of different sides of the same business card. As another example, if data items extracted from one digital image contain personal information (such as name, job title, and contact information) and data items extracted from another digital image contains business information (such as a company name, company address, and company URL), then it may be more likely that both digital images are different sides of the same business card. As a similar example, if (1) information types of data items extracted from one digital image (e.g., name, email address, phone number) is less than 60% of default information types; (2) information types of data items extracted from another digital image (e.g., employer name, logo, business address) is less than 60% of default information types; and (3) together the information types cover more than 80% of default information types, then it is likely that the two digital images are of the same business card.

Multiple of these or similar criteria may be used together to determine whether two digital images are of different sides of the same business card.

Work History

In an embodiment, a work history is automatically created and included in an online account based on information extracted from multiple digital images. For example, a user (whether registered or not) takes pictures (e.g., using client 110) of multiple business cards. Information about each employer and/or job title extracted from the series of digital images is added to the online account. Each set of extracted information (one for each business card) is labeled as either a previous job position or a current job position. In some embodiments, an online account is only configured to automatically label one job position as a current position, even though a user may be able to indicate that multiple job positions are current.

In an embodiment, a work history reflected in an online account indicates a current position and multiple past positions. The work history may not indicate an order of the multiple positions.

Alternatively, a work history of an online account includes order information that indicates an order in which the corresponding user held the past positions (if multiple past positions exist). For example, a first job position (corresponding to a digital image or two of a business card) may be associated with data that indicates that the first job position came before a second job position (corresponding to one or more digital images of another business card).

In an embodiment, an order of job positions is inferred based on an order in which the digital images of the various business cards were created. For example, if picture of a first business card is taken before a picture of a second business card, then job position information extracted from the digital image of the first business card is stored with order data that indicates that the corresponding job position came before a job position corresponding to job position information extracted from the digital image of the second business card. In this way, user input is not required to indicate which job position was held by the user first.

In an embodiment, an order of job positions is inferred based on information extracted from multiple digital images. For example, multiple business cards may indicate job titles that a user has held. Different job titles indicate a different seniority level. If a first job title (extracted from a digital image) is deemed a higher seniority level relative a second job title (extracted from another digital image), then the job position corresponding to the second job title is considered as having been held by the user prior to the job position corresponding to the first job title.

In an embodiment, in cases where account manager 132 (or another process) automatically determines an order of job positions, a user of client 110 may be prompted to confirm the order. For example, a user interface is generated and displayed to the user through client 110, where the user interface shows an initial order of job positions (e.g., indicating, for each job position, a job title, an employer name, and/or an employer logo), which order may be based on an order in which the corresponding digital images were created. The user interface may allow a user to move one or more graphical elements, each representing a job position, relative to other graphical elements (each representing a job position) in order to put the job positions in proper chronological order. Additionally, the user interface may allow the user to specify, for each job position, a start date or time period in which the user held the job position.

Organization Accounts

As indicated herein, business cards may contain a significant amount of relevant information; not only about individuals, but also about companies and other organizations that are identified on the business cards.

In an embodiment, account database 134 includes accounts for organizations, such as companies, sole proprietorships, academic institutions, charities, non-profits, etc. In this embodiment, server system 130 may host a social networking service that allows users (whether or not registered) to view information about multiple organizations. In response to a request from a client device to view a profile or "company page," the account database is accessed to identify the appropriate account and at least a portion of the information contained within the account is sent to the client device for display.

In an embodiment, server system 130 determines whether to create a new account for an organization. When analyzing a digital image for information to extract, an organization name is identified. Account identifier 132 (or another process) compares the organization name to one or more organization names stored in account database 134. Organization accounts may be stored separately (and, optionally, indexed separately) from individual profiles in order to accelerate searches of account database 134. Comparing organization names may involving performing a character-by-character comparison of the organization names. In an embodiment, one or both of the organization names may be modified prior to performing a comparison. For example, the following words and abbreviations may be removed from organization names: "Inc.", "Incorporated", "Ltd.", "LLP", "LLC", "Corporation", and "Corp." If no match is found, then a new organization account is created and populated.

Each comparison between organization names may result in a match score that indicates a strength of a match or a likelihood that two organization names match. The higher the match score, the higher the confidence that two organization names match. If a match score is below a certain threshold (e.g., 0.3) on a 0-to-1 scale, then a new account is created.

In an embodiment, one or more data items other than organization name are used to determine whether an account exists for a particular organization. For example, an organization address, an organization web address, an organization phone number, and/or a organization logo are compared to corresponding data items in an account to determine whether an account for the organization indicated in a digital image already exists. Such data items may be used in addition to or independently of organization name. For example, if an organization web address matches a web address in an existing organization account, then a new account is not updated. As another example, if an organization phone number and mailing address match corresponding data items in an existing organization account, then a new account is not updated.

Comparisons between data items of different types may result in different types of comparison scores (regardless of whether the types are for data items about individuals or for data items about organizations). For example, a comparison score for phone number may be either "match" or "no match" while a comparison score for mailing address may be on a scale between 0 and 100. Regardless of whether different types of comparison scores are used, an aggregate score may be generated based on multiple individual comparison scores.

In an embodiment, account identifier 132 (or another process associated with server system 130) determines whether to update an existing organization account. This determination may be made independent of the determination of whether to create a new organization account or made after it is determined that a new organization account should not be created. In this updating embodiment, account identifier 132 first determines whether an organization account exists (in account database 134) for an organization indicated by one or more data items extracted from a digital image. (Techniques described herein for determining whether an organization account already exists in account database 134 may be used.) If so, then a comparison is made for each of the one or more extracted data items relative to a data item in the organization account. If any comparison results in a determination that there is no match, then the corresponding extracted data item is used to update the organization account, such as by including the extracted data item in the organization account (if the organization account does not already include that information) or by replacing the non-matching data item (if one exists) with the extracted data item. For example, if a phone number in an organization account does not match an extracted organization phone number, then the extracted phone number may replace the existing phone number or may be added as one of possible phone numbers of the organization.

Logos

Account database 134 may store incomplete account information for one or more users. One piece of information that might be missing from user accounts is a logo. A logo is a graphic mark, emblem, or symbol (such as the Nike "swoosh") commonly used by commercial enterprises, organizations, and even individuals to aid and promote instant public recognition. A logo may be purely graphic (symbols/icons) or may be composed of the name of the organization. Displaying logos adjacent to user profiles or accounts may cause such user profiles to be selected and viewed more often than profiles that do not include logos.

In an embodiment, two data items that are extracted from a digital image (e.g., of a business card) are a logo and an organization name. Account manager 132 (or another component of server system 130) access a logo database where each logo is associated with an organization name but where some organization names are not associated with a logo. Account manager 132 uses the extracted organization name to determine whether the extracted organization name is used to determine whether a logo is associated with that organization name. If not, then the logo database is updated to include the "new" logo.

In an embodiment, one or more online accounts are automatically updated to include a new logo (i.e., that has been identified and extracted from a digital image). For example, a user profile that includes the organization name associated with the new logo is identified and updated to include (or otherwise be associated with) the new logo. A user account (or profile) may include multiple organization names, at least some of which the user is no longer affiliated with. Such organizations may be part of the user's work history. Thus, a new logo may be associated with a name of organization, in a user account, with which the corresponding user is employed or no longer works.

Consequently, in response to taking a picture of a single business card, many user accounts may be updated to include a new logo extracted from a digital image of the business card, even though the business card does not identify any of the users associated with the user accounts.

Later, when one or more users request to view the user account, server system 130 causes the new logo to be presented/displayed to those user(s) by, for example, sending, over network 120, to one or more computing devices, account information that includes the new logo.

In a related embodiment, server system 130 stores job postings that are displayed to multiple users. A job posting may be presented to a user in response to an explicit user request for one or more job postings. Alternatively, a job posting may appear in a user's content (e.g., news) feed that contains multiple content items through which the user may scroll and view. In this embodiment, a job posting is automatically update to include a logo of an organization that is responsible for the job posting. For example, company X (or a representative thereof) creates and submits a job posting to server system 130, which allows multiple users to view the job posting. Originally, the job posting does not include a logo of the organization. However, based on a logo extracted from a digital image of a person's business card, the job posting is automatically updated to include the logo. Thereafter, whenever the job posting is displayed to a user (whether or not in response to an explicit user request), the job posting includes the logo. Job postings with organization logos may be more likely to be selected than job postings without organization logos.

Fraud Detection

In an embodiment, information extracted from digital images (e.g., of business cards) is used to identify fraud. The fraud may be perpetuated by individuals printing unauthorized or fake business cards. Such a business card may, for example, identify a non-existent organization or may identify a legitimate organization (e.g., Apple), but where (a) the identified individual does not in fact work at or for the organization or (b) the identified individual works at the organization but does not hold a job title indicated on the business card. For example, a person may have a business card that has an Apple logo and that states that the person is a chief financial officer (CFO).

Figure 4:
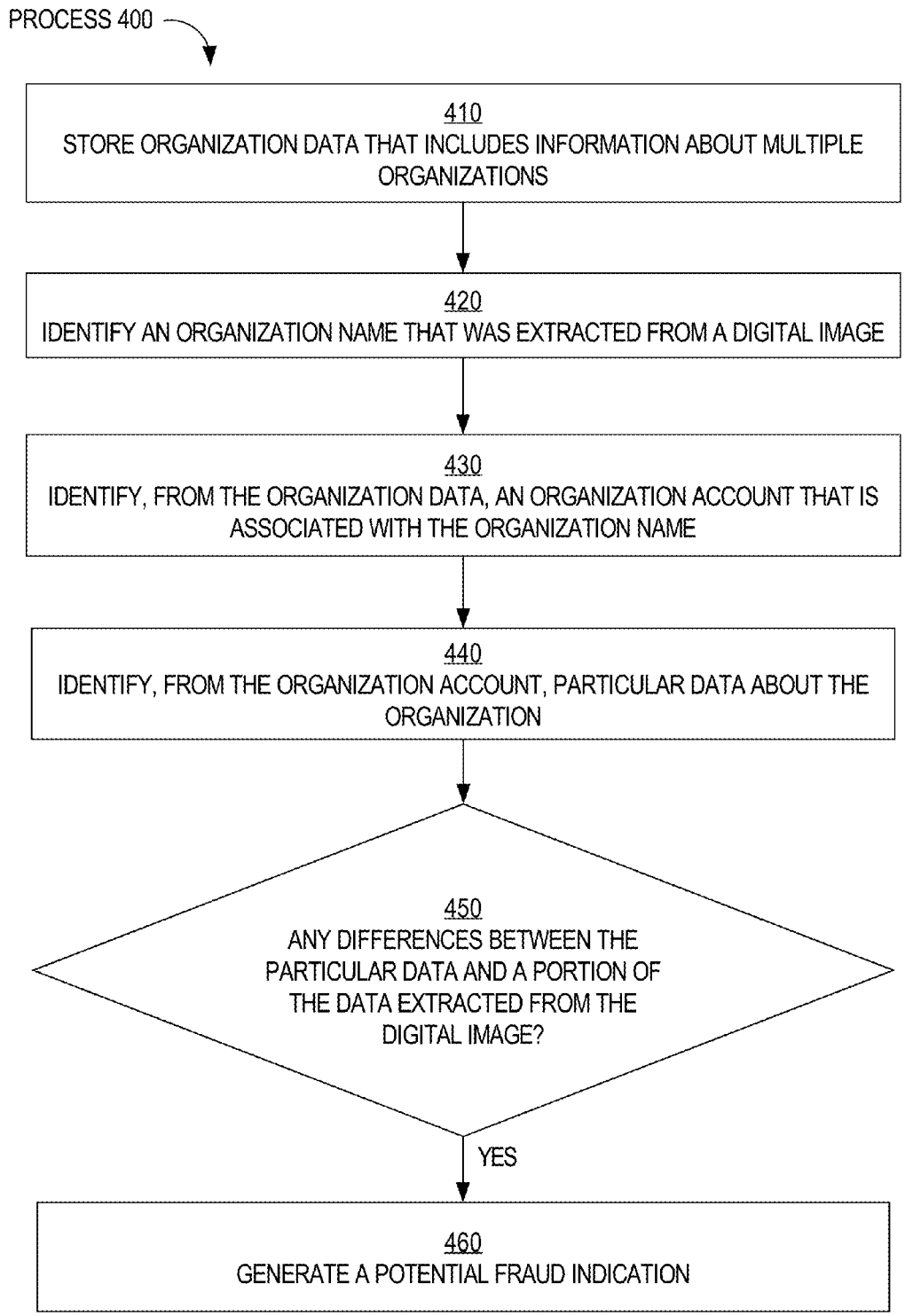
FIG. 4 is a flow diagram that depicts a process for detecting fraud in a digital image, in an embodiment.

FIG. 4 is a flow diagram that depicts a process 400 for detecting fraud in a digital image, in an embodiment. Process 400 may be implemented by account manager 132 or one or more other components of server system 130.

At block 410, organization data that includes information about or associated with multiple organizations is stored. The organization may be stored in account database 134 and/or another database (not depicted).

At block 420, an organization name that was extracted from a digital image (e.g., of a business card) is identified. The digital image may have been generated by client 110 and sent over network 120 to server system 130 for OCR analysis.

At block 430, an organization account that is associated with the organization name is identified. Block 430 may involve account manager 132 comparing the organization name with organization names of multiple organization accounts that are stored in account database 134. If the organization name matches (or roughly matches) names of multiple organization accounts, then block 430 may involve identifying each of those organization accounts.

At block 440, particular data about the organization is identified from the organization account identified in block 430. Depending on the type of fraud that is being checked for, the particular data may vary. For example, the particular data may be (a) formatting information of a common or typical business card associated with the organization, (b) a list of C-level executives, (c), a directory of employees and/or others affiliated with the organization; and/or (d) a directory of images of one or more employees/affiliates.

At block 450, it is determined whether there are any differences between the particular data (from block 440) and data extracted from the digital image (or related digital image) from which the organization name was extracted. Thus, a different portion of the extracted data is used at block 450 than at block 420.

The nature of the differences that are determined varies depending on the how the fraud is perpetuated, which may be in multiple ways. For example, if a person creates a business card that is different than actual business cards of an organization, then the differences may be comparing the format of the business card to the format of actual (or typical) business cards (as described in more detail below). As another example, if a business card indicates that a person has a C-level position when another person has the C-level position, then the difference may be a difference in the respective persons' names.

If block 450 results in the affirmative, then process 400 proceeds to block 460.

At block 460, a potential fraud indicator is generated. The potential fraud indicator may be stored in association with the digital image and/or the organization account.

Later, a user may view the potential fraud indication (along with other potential fraud indications) and the digital image to make a manual determination of whether the business card is legitimate. Additionally or alternatively to persistently storing a potential fraud indication, if the digital image is created by a computing device of a first user that is different than the user identified in the business card, then the first user is notified, for example, by sending, to the computing device or an online account of the first user, a message that indicates that the business card is fraudulent. The specific message may vary depending on the type of fraud. For example, the message may state that the job title of the person (identified on the business card) conflicts with a job title of another user that claims to hold that job title. As another example, the message may state that the person (identified on the business card) is not affiliated with or employed by the organization. As yet a further example, the message may indicate that the format of the business card does not match the format of any business card (or the typical or most common business card) associated with the organization.

Fraud Detection: C-Level Executives

One way to commit fraud with a business card is for a person to claim that s/he holds a certain position or title at an organization (e.g., CEO), when the person either is not affiliated with (e.g., does not even work at) the organization or the person is affiliated with the organization but has a much lower position or job title.

In an embodiment, process 400 involves determining whether one of the extracted data items corresponds to a job title and indicates a C-level position, such as CEO, CFO (Chief Financial Officer), CIO (Chief Information Officer), etc. If so, then it is determined whether the C-level position is held by another user. This determination may involve identifying one or more user accounts that include the organization name (and, optionally, that indicate that the corresponding user(s) currently work at the organization) and, for each user account, determining whether that user account indicates the same C-level position as the one that was extracted from the digital image. If so, then a potential fraud indication is generated.

This determination may also involve determining that the one or more identified user accounts are of users that are different than the user identified in the digital image (such as by comparing names of the user account(s) with an extracted individual name from the digital image). One scenario where such a conflict is legitimate is if the person who previously held the C-level position failed to update his/her user account/profile.

Alternatively, process 400 involves accessing publicly-available content that is retrieved over a network (e.g., network 120), such as an SEC filing or an organization web page that identifies C-level executives. In this scenario, the appropriate C-level position is identified in the retrieved content, a name of the corresponding C-level executive is extracted from the retrieved content, and that name is compared to a name (e.g., first name and/or last name) extracted from the digital image. If there is a conflict, then a potential fraud indication is generated.

Fraud Detection: Image Comparison

Some business cards include pictures or photos of people purported to be identified by the respective business cards. In one scenario, a business card contains accurate information but is being passed around by an imposter, or a person who pretends to be someone else in order to deceive others, especially for fraudulent gain. In this scenario, no fraud would be detected because all textual information is accurate. However, the business card may include an image or picture of the imposter. In an embodiment, the image or picture is recognized and extracted from a digital image of a business card (along with other business and/or person information) and compared to an image or picture of an online account that is associated with the person identified by the business card (e.g., the online account includes a first name and last name and, optionally other information, that matches information extracted from the business card). If there is a relatively low confidence that the person depicted on the business card matches a picture stored in association with the online account, then a potential fraud indication is stored.

Fraud Detection: Format Comparison

In an embodiment, the format (or "look and feel") of a business card is compared to the format of business cards of the same organization to determine whether the formats match. If not, then the first business card may be an example of fraud. For example, an imposter may have a business card created that has the name of a popular (or not so popular) company. To the average person who is not familiar with the format of business cards from that company, the business card may look legitimate, even professional. However, the business card does not accurately reflect the person's position within (or relationship with) the company.

In this embodiment, account database 134 (or another component of server system 130) includes images of multiple business cards, some of which may be of the same organization, such as a particular company or university. Each digital image of a business card is associated with a particular organization (e.g., company, university, etc.). Each organization that is associated with a digital image of a business card is associated with a format or a particular business card that represents a format that is common to many, most, or all business cards that are associated with (or identify) the same organization.

When a new digital image of a business card is received (e.g., from client 110 over network 120), one or more formatting properties of business card are determined.

Example formatting properties include font type, font size, font color, logo, edge graphics, and location information. Different data items on the same business card may have different font types, sizes, and/or colors. For example, a person's name may be in font size 10 while a job title may be in font size 8.

"Location information" indicates where one or more data items are located on a business card, either in absolute terms or in relative terms (e.g., company name appears above a business address). Absolute location information for a data item may be single dimensional (e.g., personal phone number appears one centimeter from the bottom edge of the business card) or two-dimensional coordinates (e.g., the middle character of a personal email address appears at two centimeters from the bottom edge and two centimeters from the left edge). For example, a company logo may appear at the top left-hand corner of a business card of the corresponding company. A person's name on the business card may be centered or found in the middle of the business card and the person's job title appears immediately below the person's name. Also, a single horizontal green stripe appears three millimeters from the top of the business card while a single horizontal green stripe appears three millimeters from the bottom of the business card.

Later, when a subsequent business card that identifies the same organization is received, then one or more formatting properties of the subsequent business card are determined and compared to one or more formatting properties of the previous (or original or most common) business card. If there are any differences, then there may be fraud and a potential fraud indication is stored. For example, if the font sizes of the business addresses of the two business cards are different, then there may be fraud. Alternatively, a threshold number or percentage of formatting properties need to be different in order to generate a potential fraud indicator. For example, at least 3 formatting properties or greater than 40% of the formatting properties need to be different in order to generate a potential fraud indicator and/or notify the scanning user (i.e., the person who took a picture of the business card in question). Additionally or alternatively, a fraud score is generated that indicates a relative likelihood that fraud is being perpetrated using the most recent business card. The more the number in differences of the formatting, the higher the score. Furthermore, each formatting property may be weighted such that some differences contribute less to the fraud score than others, such as font size.

If there is fraud and the person that took a picture of the business card is different than the person identified on the business card, then the person that took the picture is notified about the potentiality of fraud. The notification (e.g., sent over network 120 to client 110) may include an image of the standard, common, or expected business card and, optionally, an image of the business card in question.

Fraud Detection: Directory Check

In some scenarios, a person might pass out a business card that identifies him/her as being affiliated with (e.g., employed by) a particular organization when the person is not so affiliated. In an embodiment, such a fraud is detecting by comparing a name of that person with names in a directory of an organization identified on a business card. Thus, in this embodiment, two data items are extracted from a digital image (or two) of a business card: person name (e.g., first name and last name) organization name. Account manager 132 uses the organization name extracted from a digital image of the business card to identify a (e.g., employee) directory of that organization. The directory may be stored locally relative to server system 130 or remotely, such as by a third party service. In the local directory scenario, account manager 132 (or another component of server system 130) compares the person's name extracted from a digital image of the business card with one or more names in the directory, which may be indexed by name. In the remote directory scenario, the directory is either retrieved from the remote source or the person's name is sent to the remote source, which may make the determination and provide a result. If the person's name is not found in the directory, then it is presumed that the person is not affiliated with (or does not work at) the organization. Accordingly, a potential fraud indication is generated and processed, as described previously.

Multilingual Cognates

Many business cards have information about an individual and/or organization in multiple languages. For example, a business card may have a company name in English, Indian, and Chinese. The same business card may also have a person's name and job title in English, Indian, and Chinese. Based on a single type of data item (e.g., company name), a single association is created where the association maps a data item in one language to one or more data items in one or more other languages. Such an association is referred to herein as a "multilingual cognate" (since an association may map three or more data items in different languages to each other). For example, a cognate may comprise "Google" and "谷歌" (which is "Google" in Chinese).

In an embodiment, multiple languages are identified in information extracted from a business card. In addition to determining an extracted data item's type (e.g., first name, last name, job title, degree pursuing, business address, phone number), a language of the extracted data item is determined. Thus, multiple data items of the same type (e.g., company name) are extracted from the same business card.

Any technique may be used to determine a language of a data item. For example, a user that initiated creation of a digital image from which the data item is extracted manually specifies the language of the data item, for example, in response to a prompt that is displayed on client 110. Specifying a language may comprise the user selecting a language from a list of languages in a drop-down menu that is displayed adjacent to the data item (and, optionally, multiple data items). Server system 130 then stores, in association with the data item, data that identifies the user-selected language.

Additionally or alternatively, server system 130 automatically determines the language of a data item (i.e., without user input that identifies the language). For example, server system 130 compares the data item with a text corpus of known languages (e.g., English, Spanish, French, German, and Chinese). If the data item matches text from a text corpus of a particular language, then server system 130 stores, in association with the data item, language identification data that identifies the particular language. One example of a text corpus is a set of user profiles where the languages are known or have already been determined, whether determined automatically or determined based on user input that specifies the respective languages.

Figure 5A:
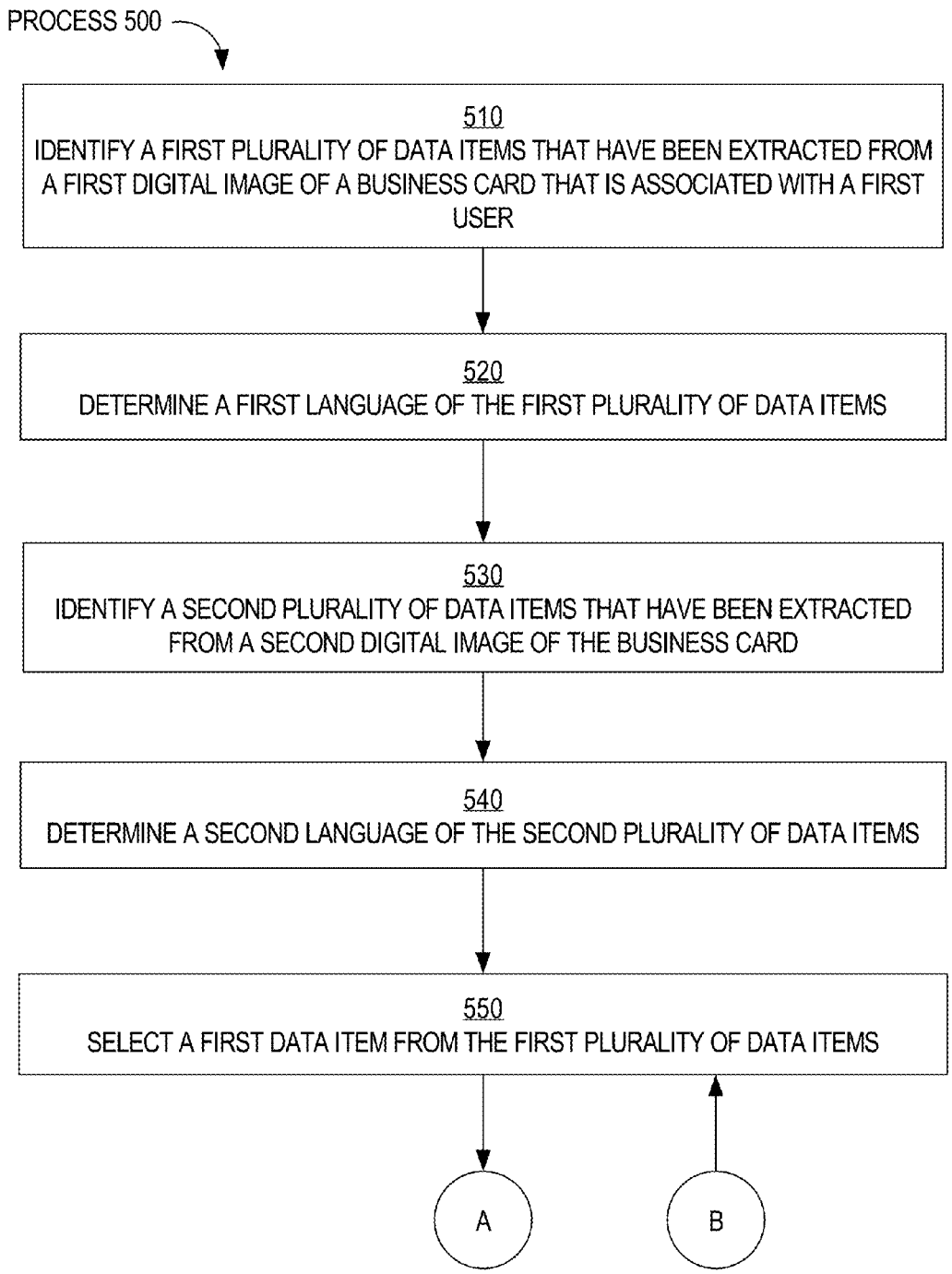
FIGS. 5A-5B are flow diagrams that depict a process for identifying multilingual cognates extracted from one or more business cards, in an embodiment.
Figure 5B:
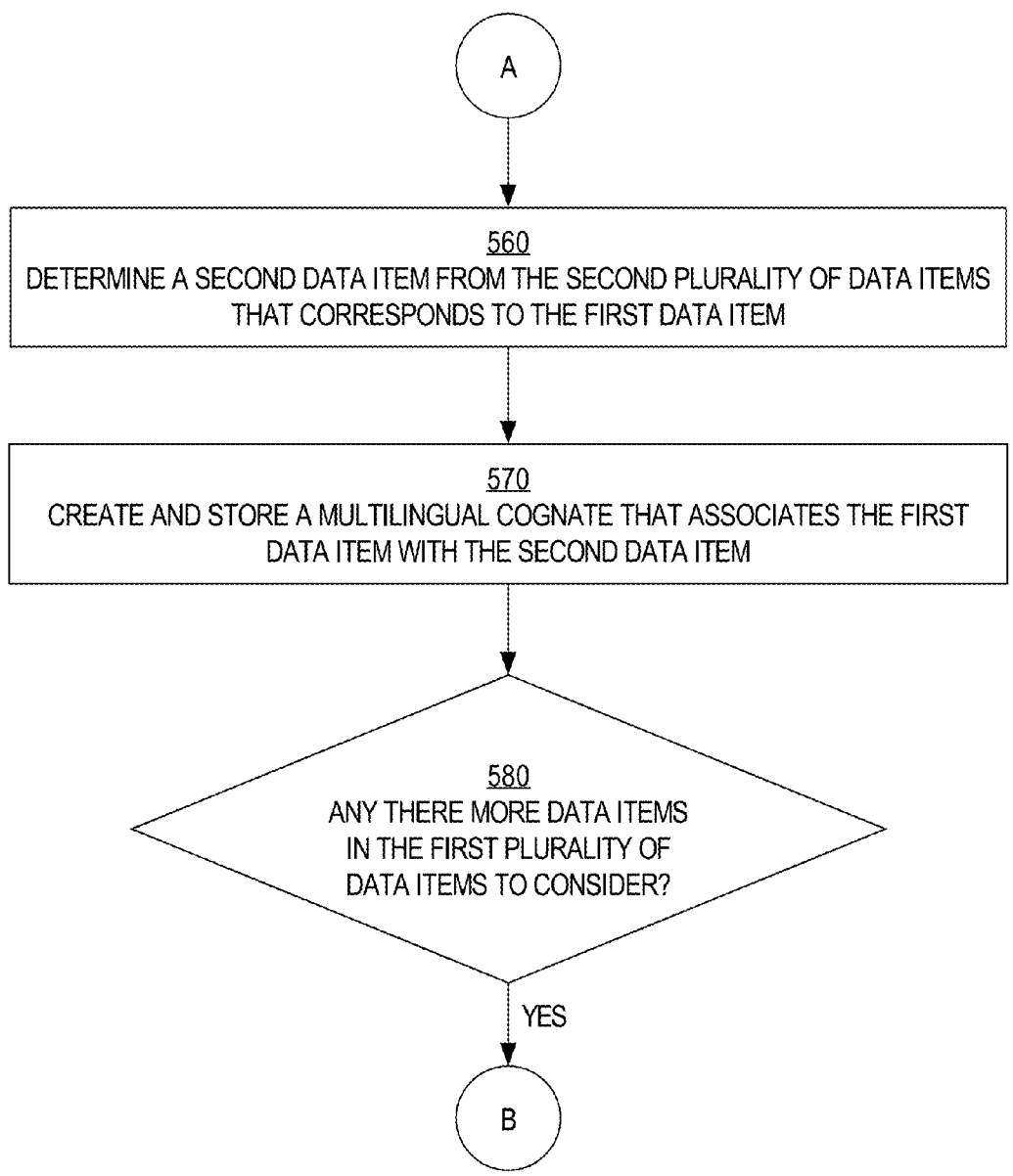

FIGS. 5A-5B are flow diagrams that depict a process 500 for identifying multilingual cognates extracted from one or more business cards, in an embodiment. Process 500 may be performed by account manager 132 or a multilingual cognate identifier (not depicted) of server system 130.

At block 510, a first plurality of data items that have been extracted from a first digital image of a first business card that is associated with a first user are identified.

At block 520, a first language of the first plurality of data items is determined.

At block 530, a second plurality of data items that have been extracted from a second digital image of the first business card are identified. The second digital image may be different or the same as the first digital image. For example, one side of a business card may contain multilingual information. As another example, one side of a business card may contain information in one language and the other side of the business card may contain information in a different language.

At block 540, a second language of the second plurality of data items is determined. The second language is different than the first language. For example, the first language may be English and the second language may be Chinese.

At block 550, a first data item from the first plurality of data items is selected. Any technique for selecting a data item from multiple data items may be used. For example, the selection may involve selecting a random data item from the first plurality of data items. As an alternative example, the selection may involve selecting the first data item that was recognized and, optionally, labeled from among the first plurality of data items.

At block 560, a second data item from the second plurality of data items that corresponds to first data item is determined. Block 560 may involve identifying, from the second plurality of data items, which data item is closest to the first data item, if the first digital image is the same as the second digital image. Thus, spatial proximity may be used as one factor (of many or exclusively) to determine data item correspondence.

If the first digital image is different than the second digital image (e.g., indicating that the digital images are two sides of the same business card), then it may be presumed that the layout of the data items is similar. For example, a person's name in English is in the middle of the first digital image and the person's name in Spanish is in the middle of the second digital image. Thus, spatial correspondence may be used as a factor to determine data item correspondence.

Alternatively, block 560 may involve identifying a data item from the second plurality of data items that is associated with the same information type (e.g., job title) as the first data item selected in block 550. This information type correspondence may be used, for example, especially if there is high confidence in labeling data items with the appropriate information types.

At block 570, a multilingual cognate that associates the first data item with the second each data item is created and stored. Block 570 may involve storing the multilingual cognate in association with the first user. Thus, multiple multilingual cognates may be identified for and stored in association with the first user. Additionally or alternatively, the multilingual cognate may be stored in a set of multilingual cognates that includes cognates identified based on processing business cards of other users.

If there are more than two sets of data items in more than two languages, then the multilingual cognate that is created and stored in block 570 may include more than two data items, such as a company name in English, a company name in Chinese, and a company name in French.

At block 580, it is determined whether there are any more data items in the first plurality of data items to consider. If so, then process 500 proceeds to block 550 where a different data item is selected. Otherwise, process 580 ends.

In an embodiment, multilingual cognates are used for subsequent data processing. Examples of subsequent data processing include training a translation model, expanding a query, determining relevant content to display to a user, and automatically translating information, such as job summaries, job postings, and user profile information.

Multilingual Cognates: Training a Translation Model

As a specific example regarding training, multiple cognates between English company names and Chinese company names are identified based on extracting information from multiple digital images of business cards. The multiple cognates are used as training data to train a translation model. Any type of translation model may be used. Embodiments are not limited to any particular type. Similarly, any technique may be used to train the translation model. U.S. patent application Ser. No. 14/820,466, which is incorporated herein by reference as if fully disclosed herein, describes how a translation model may be trained.

The translation model may be a general translation model that is used to translate information in or to other languages (e.g., German). Alternatively, the translation model may be specific to English-to-Chinese translation (and/or vice versa). Additionally, the translation model may be used to translate general types of text, such as news articles, blog posts, news alerts, social networking messages, etc. Alternatively, the translation model may be limited to translating (as in this example) company names. Thus, if the cognates are job titles, then the cognates are used to train a specific job title translation model and the translation model is used (e.g., exclusively) to translate other users' job titles.

Multilingual Cognates: Expanding a Query

In some scenarios, a user would like to submit a query to identify certain information, not knowing that relevant information may be available in another language. For example, a user may be interested in changing job positions but a job posting for a candidate job position is in a language that is different than the language of the query submitted by the user. Without translating the query, the user may never discover multiple job opportunities.

In an embodiment, multilingual cognates are identified from multiple digital images of business cards of multiple users. Because different users translate the same word or phrase differently, there may be multiple cognates for the same word or phrase. For example, one user may translate "software engineer" into one phrase in Spanish (e.g., "la ingeniería de programas") and another user may translate "software engineer" into another phrase in Spanish. Similarly, one user may translate "la ingeniería de programas" into "software engineer" and another user may translate "la ingeniería de programas" into "programmer."

A multilingual cognate may be associated with a count that indicates a number of times that cognate appears in a data set of, for example, digital images of business cards and/or user profiles. Additionally or alternatively, a multilingual cognate may be associated with a probability that, given one word/phrase of the cognate, the other word/phrase of the cognate appears in the data set.

Each multilingual cognate may also be associated with a type label that indicates an information type of the cognate, such as job title, job skill, employer name, employer name, academic institution, academic degree, geographical name, and job skills. The type label may be used in query processing to limit the number of cognates to consider (or identify a translation model) when translating a query term/phrase. Some cognates may be associated with one information type while other cognates may be associated with another information type.

Subsequently, a user (who may be different from the user associated with any of business cards from which the cognates were identified) submits a query of one or more words. Each of the one or more words may be associated with a specific context that indicates an information type. A query engine that accepts the query as input identifies one or more cognates that are associated with one or more words. Each cognate may be associated with an information type. If query text is associated with an information type, then only a strict subset of all the cognates may need to be considered to determine a translation of the query text.

For example, a user submits the query "sales representative" with a job title information type selected. A query engine accepts the query and the selected information type and identifies, among cognates that are associated with the selected information type and that have "sales representative" as one of the pairs, one or more possible translations. In this way, the selected information type is used to limit the number of cognates that need to be searched. If multiple translations are identified, then each may be in the same target language (e.g., Chinese). Alternatively, if multiple translations are identified, then one or more may be in one target language (e.g., Chinese) and one or more may be in another target language (e.g., Spanish).

Regardless of the number of translations that are identified based on a query, each translation is used as part of a search. For example, the search may involve comparing a query translation to one or more job postings that are in the same language as the query translation. Specifically, the comparison may be comparing a query translation of a job title to job titles in job postings that are in the same language as the query translation. The job postings may be provided by employers to server system 130. Additionally or alternatively, the job postings may be retrieved (e.g., using a web crawling process) from sources that are remote to server system 130 and stored at server system 130 (or at least accessible to server system 130).

As a specific example, a user that is searching for jobs may specify "Programmer" as a search term of a query. A search engine (e.g., implemented by server system 130), using the multilingual cognates, translates "Programmer" into one or more other languages, such as Chinese. The translated text is used to identify job postings that have the translated text as a job title. Additionally or alternatively, information in a search corpus is translated first and then compared to one or more search terms. For example, one or more job titles in Chinese language job postings are translated into English language job titles (using one or more multilingual cognates) and then compared to the search term "Programmer." If there is a match, then the corresponding Chinese job posting (or a translated version thereof) is provided to the searching user.

Additional techniques related to query expansion using multilingual cognates are described in U.S. patent application Ser. No. 14/820,466, which is incorporated by reference herein.

Multilingual Cognates: Translating User Profiles

In online social networks, users are generally provided with the capability to view each other users' profiles. Sometimes, the amount of a first user's profile data that a second user is able to view or access depends on (a) whether the second user is connected to the first user (either directly or indirectly through one or more other users or groups), (b) a measure of strength of that connection (if one exists), (c) how closely related the first user is to the second user, or (d) whether the second user has performed some action (e.g., paid a subscription) to be granted that access. Regardless of how the second user is able to view the first user's profile, the language of the first user's profile may be different than one or more languages that are known or familiar to the second user.

In an embodiment, a user's profile (or a portion thereof) is automatically (or in response to user input) translated into one or more languages for a different (viewing) user using multilingual cognates. A translation model that is trained based on multilingual cognates identified from digital images of business cards (as described herein) may be used to translate the user's profile. Alternatively, multilingual cognates are used directly to translate the user's profile. Thus, a multilingual profile may be: (a) extracted directly from a single multilingual business card; (b) translated by a translation model that is trained based on multiple multilingual business cards (i.e., of multiple users); or (c) inferred from the multilingual profiles of other existing users. For example, regarding (c), if two profiles have the same company name in a source language and one of the profiles has a translation of the company name in a target language, then the translation of the company name may be used.

A data item from a user profile may be translated in response to end-user input (e.g., from the corresponding user or another user who requests to view the user profile) or may be translated without end-user input. For example, an English job title of a user profile is translated in response to determining that a Spanish-speaking user has requested to view the user profile. As another example, a user that created a user profile is provided an option to translate a Chinese job title (and/or one or more other data items from the user profile) into one or more other languages so that users who know those other languages may view the job title in their respective languages.

In an embodiment, multiple translation models are used to translate different portions of a user's profile. Each translation model is associated with a different information type. For example, one translation model that is trained based on cognates associated with job titles is used to translate a job title listed in a user's profile while another translation model that is trained based on cognates associated with job skills is used to translate one or more job skills listed in the user's profile.

In an embodiment, multilingual cognates of a particular user are used to translate other types of information provided by the particular user, such as a job summary that accompanies (or is a part of) a user profile. In this embodiment, multilingual cognates extracted from a user's business card are linked to (or associated with) that user's own account if the user has one. Such multilingual cognates may be used to translate free-form text that is provided by the user. For example, the user provides a summary of his work history. A job skill in the user's profile is used to identify the job title in the summary. A job skill cognate that includes that job skill is used to translate the job skill into a target language. The other information in the summary may be translated using a generic or traditional translation model. Due to the high confidence in the translation based on the job skill cognate, the surrounding portion is more likely to be translated correctly (e.g., using a traditional translation model).

Additional techniques related to translating a user profile are described in U.S. patent application Ser. No. 14/820,466, which is incorporated herein by reference.

Multilingual Cognates: Identifying Related Content

An online service (e.g., a social network service) that has global membership may process digital content in many different languages. However, a global online service may filter content to a user based on the user's language preference, which may have been explicitly provided by the user or may have been inferred by the online service based on information about the user or behavior associated with the user. Thus, a social network service may ensure that only English content is presented to English users, only Chinese content is presented to Chinese users, and so forth. However, such an approach may prevent some potentially useful and valuable content from reaching many users of the online service.

In an embodiment, an online service (e.g., provided by server system 130) determines, based on one or more criteria, whether to provide a translated version of content that is originally in one language to a user that is associated with a different language. A translatable content item comprises text and one or more of graphics, audio, video, or any combination thereof. Examples of types of content items include blog postings, educational course listings, SlideShare presentations, news articles provided by third parties, articles from users that are considered (e.g., based on number of connections) influential by the online service, comments on other user's content, advertisements, and job postings.

An online service may use multiple rules or processes to determine which content items to present to a target user. For example, an online service may determine a relevancy of multiple content items and present only those content items that are associated with the highest (e.g., top 10) relevancy. Relevancy may be based on multiple factors, such as how connected the source or originator of the content item is to the target user (e.g., a first degree or second degree connection), whether the source/originator of the content item has communicated with the target user in the past (e.g., using the online service), whether the target user is in an address book of the source/originator and/or vice versa, how similar the target user is to the source/originator (e.g., both work in the same industry, both work for the same employer, both having attended the same academic institution), how many words or keywords in the content item are found in the target user's profile, and how many words or keywords in the target's user's profile are found in the content item.

In an embodiment, one or more multilingual cognates identified from digital images of one or more business cards are used to translate a user's profile (or portion thereof) into a target language. The translated portion is then compared to a content item that is already in the target language to determine whether the content item is relevant to the user. The translation of the user's profile may occur prior to or subsequent to determining whether to present the content item.

Additional techniques related to translating content items are described in U.S. patent application Ser. No. 14/820,466, which is incorporated herein by reference.

Recommending Connections

In an embodiment, the identity of a user that scans one or more other users' business cards is used to identify one or more users to present as people to connect to in a social network. Server system 130 provides a feature where system 130 identifies, for a particular user, one or more other users that the particular user may know or at least may desire to connect to. Such users are referred to herein as "people you may know" (PYMK) (or "person you may know" in the singular). Candidates for PYMK may come from users who share a common characteristic with the particular user, such as being employed at the same company, having attended the same academic institution, being connected to the same people, etc. In this embodiment, the identity of users who have scanned other people's business cards and/or the identity of users who have had their business cards scanned is used to identify PYMK for certain users.

For example, user A scans user B's business card. User B scans user C's business card. User A is identified as a candidate PYMK for user C. Additionally or alternatively, user C is identified as a candidate PYMK for user A.

In a related embodiment, one or more factors restrict the extent to which PYMKs are identified based on business card scans. Examples factors include temporal proximity and frequency. Given the previous example, if the period time between (1) user A's scan of user B's business card and (2) user B's scan of user C's business card is greater than a particular threshold (e.g., 20 days), then (1) and (2) will not be used as a basis to identify user C as a PYMK for user A and vice versa. In a similar example, if neither user A nor user B has scanned a threshold number of business cards, then (1) and (2) will not be used as a basis to identify user C as a PYMK for user A and vice versa.

In a related embodiment, the identity of a scanner (e.g., user A in the previous example) or scannee (e.g., user C in the previous example) is used as one of many factors to identify PYMK for a particular user. For example, one PYMK technique is to identify similarity between users using one or more similarity metrics and generate a relevancy score for a certain user relative to a particular user. The relevancy score is used to rank and prioritized which users to present as PYMK to the particular user. All things being equal, the fact that user A scanned a business card of an existing connection of user D increases a relevancy score for user A, causing an identity of user A to be presented to user D as a PYMK. Additionally or alternatively, all things being equal, the fact that a business card of user E was scanned by an existing connection of user G increases a relevancy score for user E, causing an identity of user E to be presented to user G as a PYMK.

Additional Embodiments

Multiple embodiments are described herein in different sections. Even though the embodiments are described in different sections, system 100 may implement a number of the embodiments simultaneously. For example, server system 130 may be capable of automatically creating user accounts and organization accounts, updating user accounts and organization accounts, identifying and leveraging logos extracted from business cards, detecting fraud in business cards, and/or identifying and leveraging multilingual cognates. Similarly, client 110 may be capable of processing data and displaying data, received from server system 130, that is based on any of these various activities.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
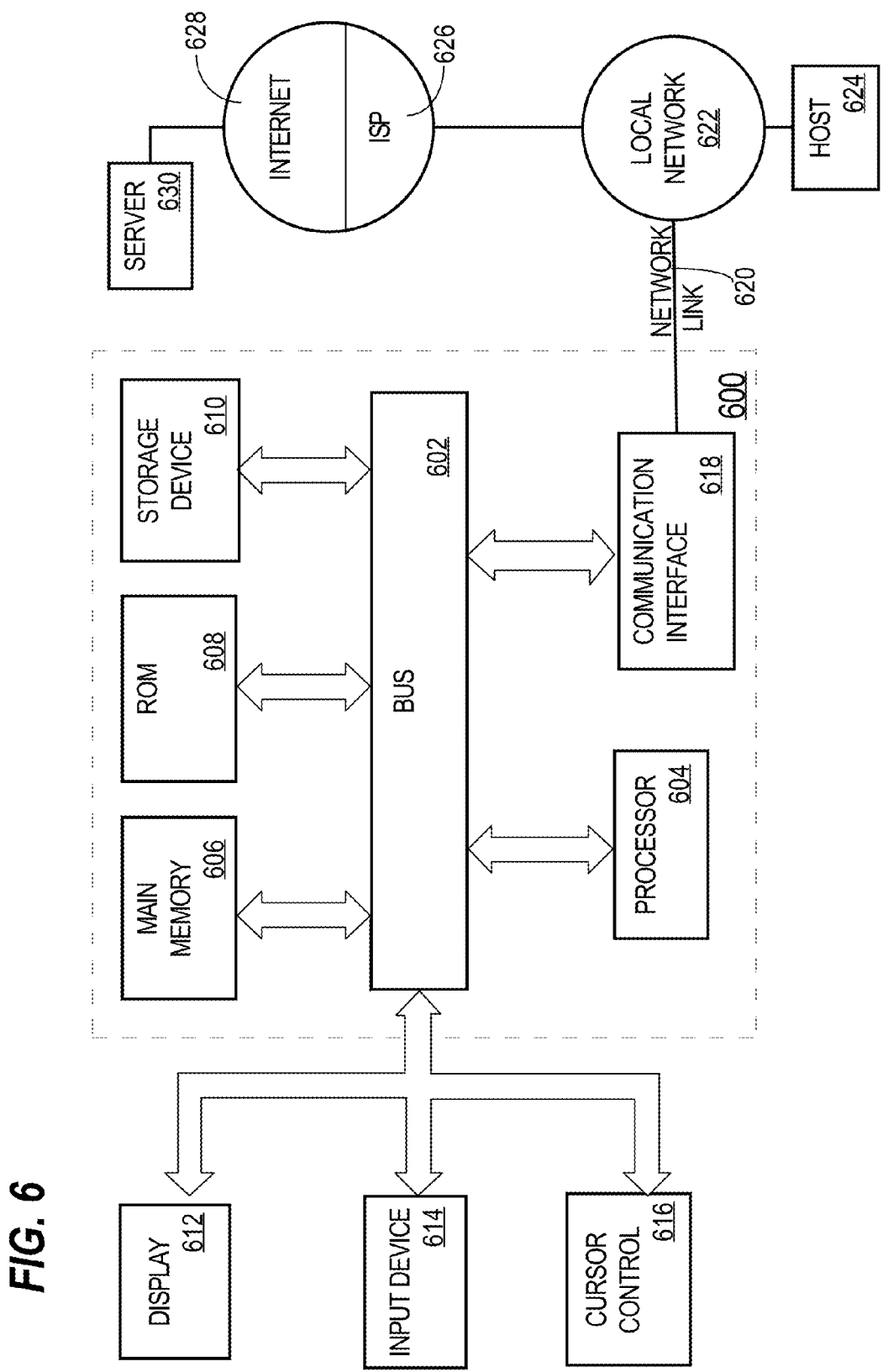
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    identifying a plurality of data items that have been extracted from a digital image of a business card that is associated with a user;
    wherein a particular data item in the plurality of data items is contact information of the user;
    causing a verification code to be sent, based on the particular data item, to a computing device of the user;
    receiving, from the computing device of the user, the verification code;
    in response to receiving the verification code:
        causing an account to be created for the user, and
        causing the account to include at least a subset of the plurality of data items;
    wherein the method is performed by one or more computing devices.

2. The method of claim 1, wherein causing the verification code to be sent is performed in response to the digital image of the business card being created.

3. The method of claim 1, wherein:
    causing the account to be created comprises creating a social network account that is maintained by a social networking service; and
    causing the account to include at least the subset of the plurality of data items comprises storing the subset of the plurality of data items in the social network account.

4. The method of claim 1, wherein:
    the plurality of data items include a first data item and a second data item;
    causing the account to include at least the subset of the plurality of data items comprises causing the first data item to be stored in association with a first access privilege and causing the second data item to be stored in association with a second access privilege that is different than the first access privilege.

5. The method of claim 1, wherein:
    the computing device is a first computing device that is different than a second computing device that is associated with a second user who is different than the user;
    the second computing device created the digital image of the business card.

6. The method of claim 5, wherein the second user is associated with a second account of a social networking service, the method further comprising:
    in response to the account being created, causing, to be displayed to the user, a connection request that indicates the second user.

7. The method of claim 5, further comprising:
    determining whether to send a verification code over a cellular network to the first computing device;
    wherein causing the verification code to be sent comprises causing the verification code to be sent only in response to determining to send the verification code over the cellular network to the first computing device;
    storing a second plurality of data items that have been extracted from a second digital image of a second business card that is associated with a third user;
    wherein a second data item in the second plurality of data items is contact information of the third user;
    determining whether to send a second verification code over the cellular network to a third computing device of the third user;
    in response to determining not to send the second verification code over the cellular network to the third computing device, causing a message to be sent, based on the contact information of the third user, over a data network to an online account of the third user.

8. The method of claim 7, further comprising:
    receiving first input through the second computing device, wherein determining whether to send the verification code over the cellular network to the first computing device is based on the first input;
    receiving second input through the second computing device, wherein determining whether to send a second verification code over the cellular network to the third computing device is based on the second input.

9. The method of claim 1, wherein:
    causing the verification code to be sent to the computing device of the user comprises causing the verification code to be sent as a text message over a cellular network or causing an email message that includes the verification code to be sent to an email account of the user;
    a data item of the plurality of data items corresponds is a phone number or an email address that is listed on the business card.

10. The method of claim 1, further comprising, prior to causing the verification code to be sent to the computing device:
    receiving, from a first computing device, the digital image of the business card;
    analyzing the digital image to extract the plurality of data items from the digital image.

11. The method of claim 1, wherein:
    the plurality of data items is a first plurality of data items;
    the digital image is a first digital image of a first side of the business card;
    the method further comprising identifying a second plurality of data items that have been extracted from a second digital image of a second side of the business card, wherein the second side is different than the first side;
    causing the account to include at least the subset of the first plurality of data items comprises causing the account to include at least a subset of the second plurality of data items.

12. The method of claim 1, further comprising:
identifying a first job information that has been extracted from a second digital image of a second business card that is associated with a second user;
identifying a second job information that has been extracted from a third digital image of a third business card that is associated with the second user;
causing an online account that is associated with the second user to be updated to include a work history of the second user, wherein the work history includes at least a subset of the first job information and at least a subset of the second job information.

13. The method of claim 12, wherein:
determining an order of the first job information and the second job information;
causing the online account to be updated comprises causing the online account to display the first job information and the second job information based on the order.

14. The method of claim 13, wherein determining the order comprises determining that the second digital image was created before the third digital image, wherein the work history indicates that a job associated with the first job information occurred prior to a job associated with the second job information.

15. The method of claim 13, wherein determining the order comprises determining that a second job title indicated in the second job information is more senior than a first job title indicated in the first job information, wherein the work history indicates that a job associated with the first job information occurred prior to a job associated with the second job information.

* * * * *